March 16, 1954     E. L. ROBINSON     2,672,532
TURRET PROBE SWITCH
Filed July 6, 1951
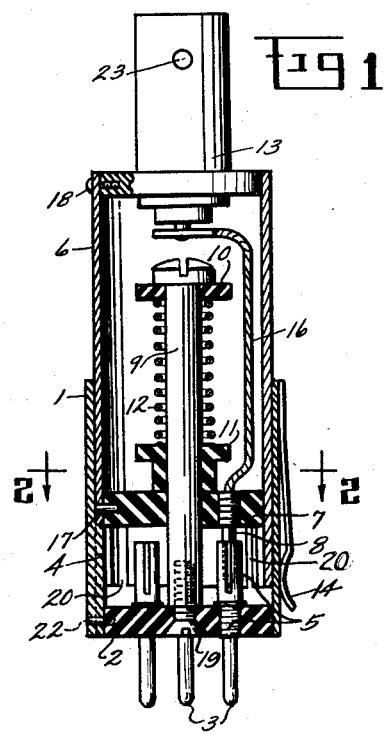
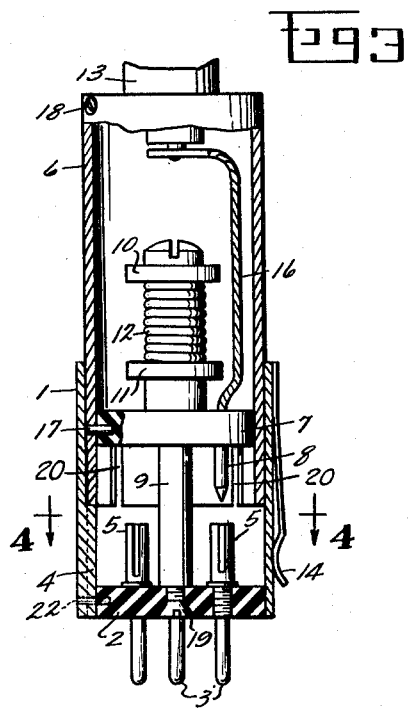
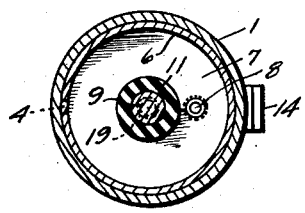
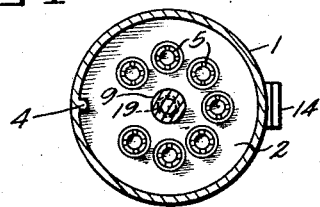
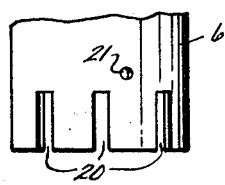
INVENTOR.
EDWARD L. ROBINSON
BY
AGENT
ATTORNEY Patented Mar. 16, 1954

2,672,532

UNITED STATES PATENT OFFICE 2,672,532

TURRET PROBE SWITCH

Edward L. Robinson, Lexington, Mass., assignor to the United States of America as represented by the Secretary of the Air Force Application July 6, 1951, Serial No. 235,552

3 Claims. (Cl. 200—51.05)

(Granted under Title 35, U. S. Code (1952), sec. 266)

The invention described in the foregoing specification and claims may be manufactured and used by or for the Government for governmental purposes, without the payment to me of any royalty thereon.

This application concerns a turret probe which provides means for taking signals from or feeding signals into a tube socket by means of coaxial cable without requiring modifications to the chassis or components or removing the cover.

The probe is designed to plug into a tube socket in place of a tube, and contact is made with any contact of the tube socket by means of a rotating turret which has a suitable R. F. connector providing a coaxial output from the probe.

The object of this invention is to provide a readily accessible means for taking signals from or feeding signals into a tube socket by means of a coaxial cable.

A further object of this invention is to provide means for selectively taking signals from or feeding signals into any desired individual contact of a tube socket via a coaxial cable.

A further object of this invention is to provide an adjustable probe to plug into a tube socket in place of a tube whereby contact may be made selectively with any contact of the tube socket.

Referring to the drawings:

Fig. 1 is a central vertical section through the complete turret probe assembly embodying the invention illustrating the normal operative position.

Fig. 2 is a horizontal sectional plan view on the line 2—2 of Fig. 1.

Fig. 3 is a central vertical section through the turret probe assembly shown in a raised position.

Fig. 4 is a horizontal sectional plan view on the line 4—4 of Fig. 3.

Fig. 5 is a fragmentary view of the bottom slotted portion of the turret or sliding tube member.

Like numerals refer to like parts throughout the several views of the drawings.

In the drawings, sliding tube or turret 6, which may be of brass seamless tubing, is slidably mounted within a sub-assembly base comprising parts 1 through 5 and 14; this sub-assembly base includes an outer tube 1, preferably of brass seamless tubing. A base disk 2, made of linen base Bakelite, for example, and shown in detail in Fig. 4, is fastened to the outer tube 1 by means of 3 pins 22 spaced 120° apart around the periphery of tube 1. Base disk 2 is push fit in outer tube 1. Three holes are drilled 120° apart in the base disk 2 to receive pins 22. The base disk has a plurality of tapped holes into which the various base pin assemblies, described later in the specification, are inserted.

The center of the base disk 2 is countersunk to allow for the insertion of a flat-head screw 19. A pair of Phosphor bronze spring clips 14, only one of which is shown in Figs. 1 and 3, are soft soldered to outer tube 1 and provide for contacting the shield of a tube socket. A single brass key 4, of square cross-section, is also soft soldered to the inner wall of outer tube 1. As shown in Figs. 1 and 3, each base pin assembly comprises a pin 3, which may be of beryllium copper, soft soldered to a contact 5 having a threaded portion which is screwed into the corresponding tapped hole in base disk 2; the remaining portion of contact 5 comprises a slotted contact having four slots formed by saw cuts, see Fig. 4. The position of the base pins in the sub-assembly base is shown in Figs. 1 and 3.

An upper disk 7, push fit in turret or sliding tube 6, and made of the same material as base disk 2, is fastened to turret 6 by means of three pins 17 inserted in three holes 21 drilled 120° apart in the upper disk 7. A single tapped hole in upper disk 7 allows for the insertion of the threaded portion of contact pin 8, as illustrated in Figs. 1 and 2.

A hole in upper disk 7 allows for the insertion of spring rod 9. The latter is supported by the upper disk and fastened to the base disk by flat head screw 19. A spring 12 is mounted between an insulating washer 10 and on insulating sleeve 11, all surrounding spring rod 9, as shown in Figs. 1 and 3; insulating washer 10 is in contact with the head of spring rod 9 and insulating sleeve 11 rests on top of upper disk 7. A coaxial connector 13 having two bayonet pins 23 spaced 180°, is mounted at the top of turret 6 by means of three screws 18 spaced 120° apart. A coaxial cable is connected in the usual manner to coaxial connector 13. A piece of insulated wire 16 is soft soldered to the inner conductor of the coaxial connector 13 and threaded end of contact pin 8, respectively, as shown in Figs. 1 and 3.

In operation, the sliding tube or turret 6, which is in slide fit with outer tube 1, is manually pulled upward against the tension of spring 12, as shown in Fig. 3, until the slotted portion 20 of turret 6 is clear of key 4 on the sub-assembly base. Simultaneously, contact pin 8 is withdrawn from contact with base pin 5.

The number of slots 20 in turret 6 is equal to the number of base pins or socket contacts. The angular spacing of the slots in turret 6 corresponds exactly to the angular spacing of the tube socket contacts. Turret 6 is then rotated until the particular slot corresponding to the desired connection between coaxial conductor and pin 3 coincides with the position of key 4 in outer tube 1. Turret 6 is then released so that it falls downward with key 4 engaging the desired new slot 20. In this manner, a connection of the inner conductor of coaxial connector 13 to a different base contact and socket pin is obtained. In the same manner, the sliding tube may be turned through other angles to enable the operator to make connection between the inner conductor of a coaxial cable connected to said coaxial connector and any desired socket connection.

Provisions may be made to incorporate various circuits, such as a crystal detector, within the probe.

A probe for a miniature seven contact tube socket has been described; the principle of this invention, however, is applicable to any type of tube socket.

The type of connector used in this invention is not necessarily limited to the one shown in the drawing.

Having thus described my invention, what I claim is:

1. A turret probe adapted for use with a tube socket comprising an insulating base member having an upper face and a lower face, a plurality of base pins secured to said insulating base member, each of said base pins having a first portion extending above said upper face and a second portion extending below said lower face of said insulating base member, said second portion of each of said base pins having such shape as to mate with its corresponding contact of said tube socket, said base pins being radially spaced about a point on said insulating base member a distance equal to the radial spacing of the contacts of said tube socket, said base pins being angularly spaced about said point on said insulating base member so as to align with the contacts of said tube socket, a turret member rotatably and translatably mounted with respect to an axis passing through said point on said insulating base member, a contact pin mounted on said turret member and spaced from said axis a radial distance equal to the radial spacing of said base pins whereby said contact pin will mate with said first portion of said base pins when said turret is rotated with respect to said insulating base member, and means connected to said contact pin and extending therefrom to a position away from said base member whereby a probe lead may be connected to said contact pin.

2. A turret probe according to claim 1 having in addition thereto means for biasing said turret member translatably along said axis toward said insulating base member.

3. A turret probe according to claim 1 having in addition thereto indexing means whereby said turret member may be moved toward said base member only when said contact pin on said turret member is in alignment with one of said base pins.

EDWARD L. ROBINSON.

References Cited in the file of this patent

UNITED STATES PATENTS

| Number | Name | Date |
|---|---|---|
| 695,366 | Ayer | Mar. 11, 1902 |
| 810,949 | Kloman | Jan. 30, 1906 |
| 1,150,112 | Hadaway, Jr. et al. | Aug. 17, 1915 |
| 1,606,063 | Edwards | Nov. 9, 1926 |
| 1,870,762 | Winter | Aug. 9, 1932 |
| 2,088,355 | Wehming | July 27, 1937 |
| 2,378,294 | Field et al. | June 12, 1945 |
| 2,432,476 | Hesse | Dec. 9, 1947 |

FOREIGN PATENTS

| Number | Country | Date |
|---|---|---|
| 45,659 | Sweden | Apr. 23, 1917 |